Feb. 23, 1960

J. S. ROBBINS

2,925,903

CONVEYOR

Filed April 4, 1956

INVENTOR
James S. Robbins
BY
ATTORNEY

Feb. 23, 1960

J. S. ROBBINS 2,925,903

CONVEYOR

Filed April 4, 1956

INVENTOR
James S. Robbins

BY *Robert N. Dunning*

ATTORNEY

Feb. 23, 1960 J. S. ROBBINS 2,925,903
CONVEYOR
Filed April 4, 1956 7 Sheets-Sheet 3

INVENTOR
James S. Robbins
BY Robert M. Dunning
ATTORNEY

Feb. 23, 1960     J. S. ROBBINS     2,925,903
CONVEYOR Filed April 4, 1956     7 Sheets-Sheet 5

INVENTOR
James S. Robbins

BY
ATTORNEY

Feb. 23, 1960  J. S. ROBBINS  2,925,903
CONVEYOR

Filed April 4, 1956  7 Sheets-Sheet 6

INVENTOR
James S. Robbins
BY
ATTORNEY

United States Patent Office 2,925,903
Patented Feb. 23, 1960

2,925,903

CONVEYOR

James S. Robbins, St. Paul, Minn.

Application April 4, 1956, Serial No. 576,182

1 Claim. (Cl. 198—191)

This invention relates to an improvement in conveyors wherein it is desired to provide a high-speed, low cost conveyor capable of transporting material over virtually any length or distance.

Various types of belt conveyors have been produced in the past. Most such conveyors are subject to certain difficulties. In the first place, the belts which support the weight normally travel over rollers or other similar supports which creates considerable friction unless the supports are rotating with the conveyor. In the case the supports are driven, the cost of operating these rotatable supports is extreme over extended distances. Secondly, the angle to which a belt conveyor may be tilted to carry loose material is also normally limited as the loose material has a tendency to slide rearwardly on the conveyor as it travels upwardly on a steep slope, the material thereby falling from the sides of the conveyor. Furthermore, due to the friction normally experienced with elongated belt conveyors, it has been normally impractical to produce such conveyors at low cost. It is an object of the present invention to avoid these previous difficulties.

A feature of the present invention resides in the provision of a belt conveyor which is supported between a pair of generally parallel cables. Springs of unusual design connect the cable to the sides of the belt at frequent intervals. These spring connectors are capable of flexing so that the distance between the cables and the belt may vary. The cables travel over a series of spaced sheaves and the cable normally will flex to some extent causing a sag in the cables between the spaced sheaves. The spring connectors connecting the cables to the belt are so arranged that the belt may travel along a substantially straight line of movement due to the ability of the spring connectors to expand and contract.

A feature of the present invention resides in the fact that the supporting cables are trained in torsion by the multiple connectors connecting each cable with the belt. The connectors are attached to the cable in a manner to extend generally radially therefrom. As the weight of the conveyor and its contents tends to normally hold the belt edges directly beneath the cables, the cables are held from twisting by the longitudinally spaced connectors. At the ends of the conveyor flights, the connectors twist the cable about one hundred eighty degrees about its axis so that the connectors extend upwardly from the cables during the return flight.

A feature of the present invention resides in the provision of a belt conveyor which is supported by spaced spring members connected to a pair of spaced cables. The spring connectors are so constructed that the points of attachment between the spring connectors and the belt are usually directly below the cables. As a result, the weight of the material upon the belt holds the cables in the grooves.

An added feature of the present invention resides in the provision of a belt conveyor, the sides of which are connected to supporting cables by spring connectors which are so shaped that the cables can travel over spaced grooved sheaves without undue wear upon the spring connectors. The connectors are so shaped that the portion of the spring connectors connected to the cable always tend to extend upwardly or laterally from the cables so that the lower portions of the cables may ride in groove sheaves positively preventing contact between the connectors and the sheaves.

A further feature of the present invention resides in the provision of a conveyor which may, if desired, extend upwardly at a considerable angle to the horizontal. The cables which support the opposite edges of the belt may be guided nearer together or farther apart by the supporting sheaves. When the supports are moved close together, the belt has a tendency to flex toward a trough shaped form and when the cables are moved still closer together, the edges of the belt tend to move toward a tubular form to actually enclose the major portion of the contents of the conveyor. Accordingly, if desired, the contents of the conveyor may be conveyed by what amounts to substantially a hollow tubular belt so that the contents of the conveyor cannot readily fall from the conveyor even when the material is carried upwardly at a considerable angle to the horizontal.

An added feature of the present invention resides in the provision of a conveyor which can be constructed at a relatively low cost. The belt is supported by spaced cables which travel over spaced sheaves. As the conveyor is driven by the cables, there is no tension on the conveyor belt. As a result, there is a minimum of friction involved in the movement of the conveyor. As a result, the power required to drive the conveyor may be maintained at a minimum and the cost of the supporting structure is also but a fraction of the cost involved in supporting belt conveyors of conventional types. The load supported by the belt may also be carried more smoothly and evenly than in constructions where the belt must travel over spaced rollers or similar supports. Each time the belt passes over a supporting roller, the material on the belt tending to cause a sagging of the center of the belt exerts a considerable force through the belt upon the roller thereby increasing the power required to move the belt as well as the cost of supporting the belt. In the present construction, the belt may assume a natural curved or trough shaped form if desired and there are no rollers at spaced intervals to interfere with the cross sectional shape of the belt, thereby greatly simplifying the driving of the conveyor.

A further feature of the present invention resides in the fact that a conveyor of virtually any desired length may be employed, thereby making it possible to provide a conveyor which may move material cross country over very long distances if desired. With the present arrangement, cable supports may be suspended from spaced towers between which supporting cables or similar means are provided. The supporting cables naturally tend to sag a considerable amount between towers if the space between towers is considerable. Hangers such as those employed on suspension bridges and the like may be used to suspend the spaced sheaves on a substantially even plane. The cable may travel over these sheaves and the springs connecting the cable to the belt will flex sufficiently so that the belt may travel along a substantially straight line.

Another feature of the present invention resides in the speed which may be obtained by my conveyor. In actual practice, it has been found possible and practical to convey material at speeds which are greatly in excess of the speed attained by any other belt conveyor with which I am familiar. This is due to the fact that the supporting cables may move readily and with little friction over spaced supporting sheaves and the spring connectors between the cables and the belt act to cushion the belt support. The load upon the conveyor belt accordingly rides smoothly and with little interference and the power for propelling the conveyor may be applied wherever required or desired.

Another feature of the present invention resides in the provision of a conveyor which may comprise a two-way conveyor if desired. Due to the flexibility of the cables, the belts, and the connecting springs, it is possible to provide a conveyor capable of transporting material in opposite directions, the two parts of the conveyor moving in opposite directions being supported either in superimposed relation or in side-by-side relation. The connecting springs connecting the cables and edges of the belt function equally well in either direction of travel.

An added feature of the present invention resides in the provision that the motivating force of the conveyor may be at the inlet end of the conveyor if it is so desired. Due to the fact that the belt is supported by endless cables, the sheaves which support the cables and which act to drive the cables may be located at either end of the conveyor or intermediate the ends thereof as is preferred. Still another feature of the present invention resides in the fact that if desired the belt need not contact any supporting rollers even out at the ends of the conveyor. The cables which support the side edges of the conveyor may travel over sheaves of considerable diameter and the springs connecting the cables with the belt merely guide the belt in a generally semi-circular path at each end of the conveyor without contacting any roller or drum if it is preferred.

These and other objects and novel features of the present invention will be more clearly and fully set forth in the following specification and claim.

In the drawings forming a part of the specification.

Figures 1, 2:
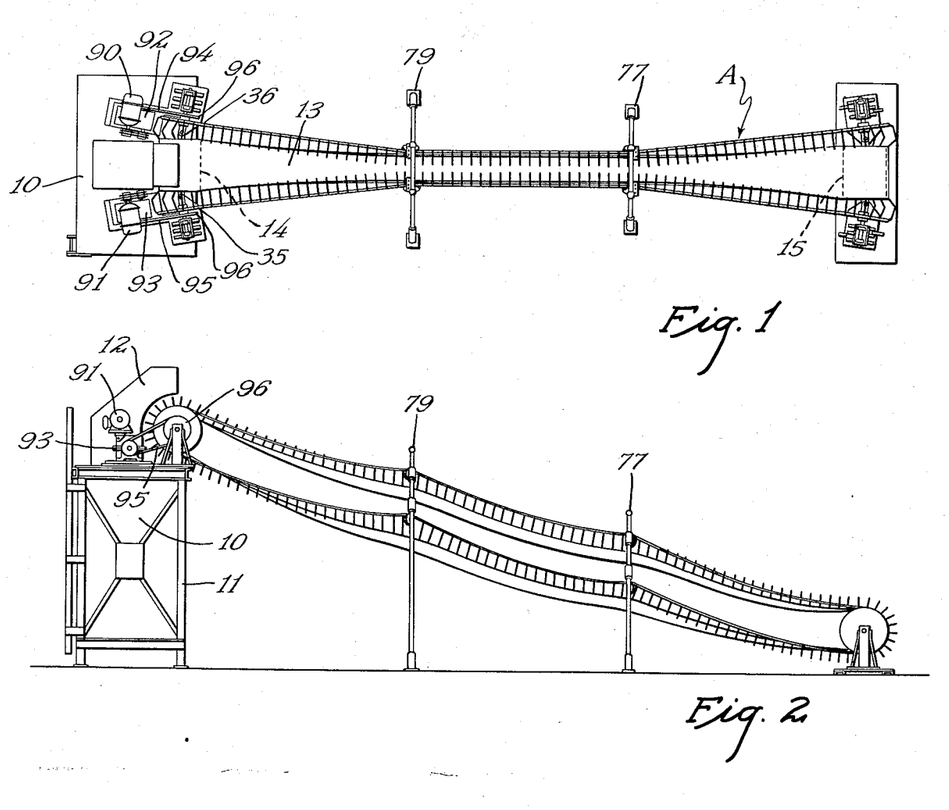
Figure 1 is a top plan view of a conveyor, showing the principle of construction of the conveyor.
Figure 2 is a side elevational view of the conveyor illustrated in Figure 1.
Figures 3, 4, 5, 6:
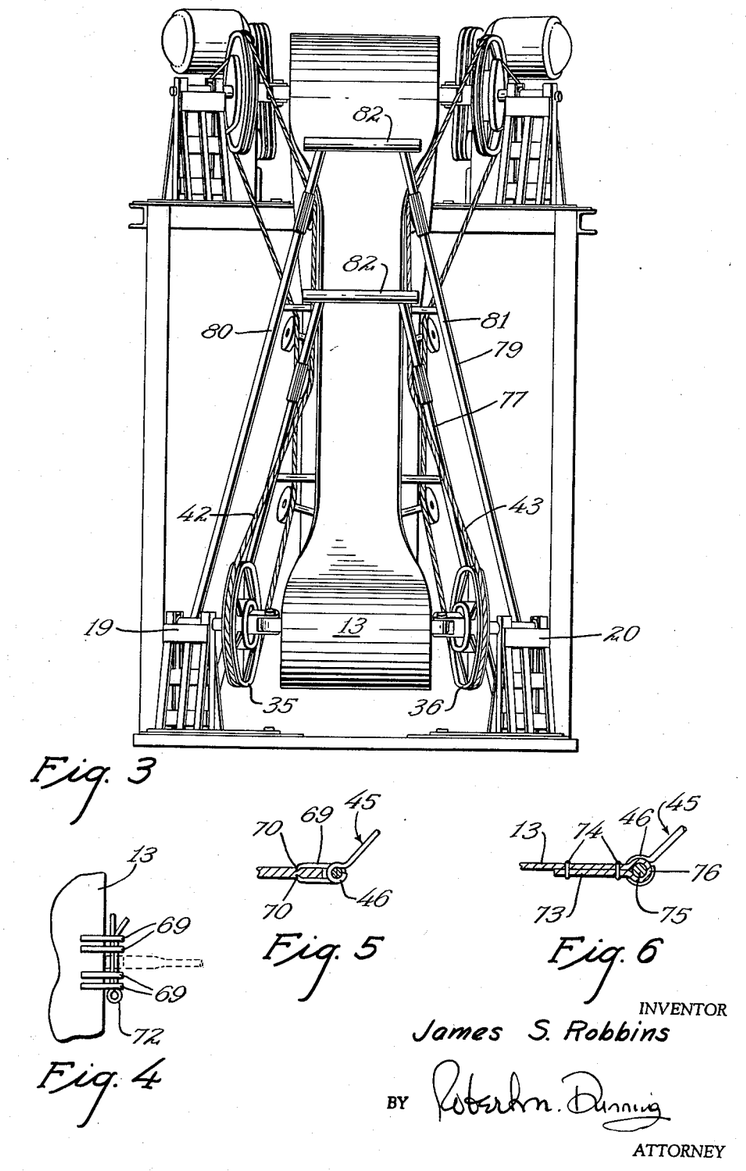
Figure 3 is an end view of the conveyor illustrated in Figures 1 and 2 in enlarged form.
Figure 4 is a detail view showing one manner in which the supporting springs may be attached to the conveyor belt.
Figure 5 is a sectional view through a portion of the belt showing the fastening means illustrated in Figure 4.
Figure 6 is a sectional view through a modified form of pivotal connection between the springs and the edges of the belt.

In Figures 1, 2 and 3 of the drawings, a conveyor system is illustrated which demonstrates certain of the principles of my invention. The conveyor illustrated in these figures is substantially shorter than might be considered commonplace but does show a practical system which has been actually used. In general, the conveyor A is designed to transmit material placed upon the conveyor at the lower end thereof into a storage hopper or bin 10 at the upper end of the conveyor. The conveyor bin 10 is supported by a general rectangular platform 11 provided at its upper extremity with a hood 12 providing a means of guiding the material conveyed by the conveyor into the hopper or bin 10.

The conveyor A includes an endless belt 13 which in the particular construction illustrated extends between two parallel drums or pulleys 14 and 15. As both of these drums or pulleys are substantially identical, only one is illustrated in detail, this being illustrated in Figure 7 of the drawings. The pulley 15 is mounted upon a base 16 while the pulley 14 is mounted on the top of the platform or frame 11.

Figure 7:
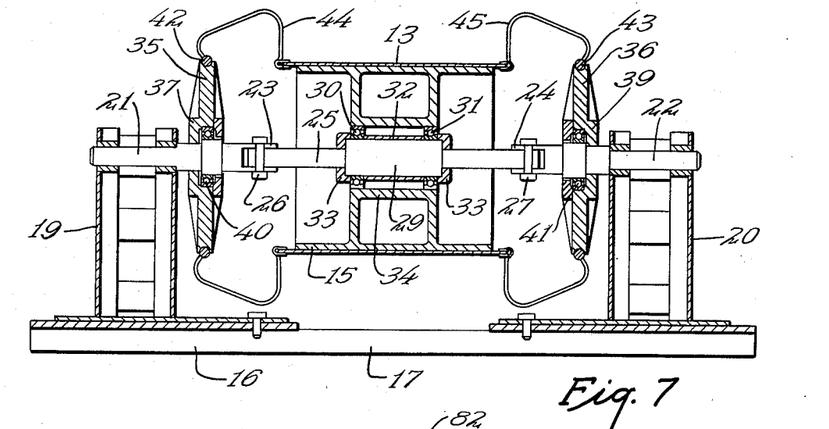
Figure 7 is a sectional view through the end of the conveyor showing a drum over which the belt may pass to change the direction thereof.

The pulley support is shown as including a base member 17 of any suitable type or design having a pair of upright bearing supporting members 19 and 20 near opposite ends thereof. The section shown in Figure 7 is not in a common plane, the section line bending at the point of connection between the center portion of the shaft and the two side portions thereof.

The upright supports 19 and 20 act to support shaft members 21 and 22 which may be fixed relative to the supports. The inner ends of the shafts 21 and 22 are slotted as is indicated at 23 and 24 respectively. A central shaft portion 25 extends between the upper and lower sides of the slotted shaft ends 23 and 24 and bolts or other fastening means indicated at 26 and 27 support the central shaft portion 25. The central shaft portions of the two drums 14 and 15 at opposite ends of the conveyor are usually parallel in the event the conveyor is relatively short in length.

The central shaft 25 is provided with a central enlarged diameter portion 29 which acts to support axially spaced bearings 30 and 31. The spacing sleeve 32 extends between the inner races of the bearings 30 and 31 to space these bearings, and end caps 33 encircling the shaft portion 25 act to hold the bearings 30 and 31 in proper location. The drum 14 or 15 is provided with an integral hub 34 which encircles the bearings 30 and 31 and is supported thereby. Thus, the drum or pulley 14 or 15 is supported for rotation about the shaft 25.

Sheaves 35 and 36 are mounted upon the shafts 21 and 22 for rotation with respect thereto. These sheaves 35 and 36 are provided wtih hubs 37 and 39 respectively which enclose bearings 40 and 41 interposed between the sheave hubs and the shafts 21 and 22. As a result, the sheaves 35 and 36 may rotate freely. The purpose of the particular arrangement illustrated is to permit the axis of the drum 15 to be parallel to the axis of the opposite drum while, at the same time, permitting the axes of the sheaves 35 and 36 to be angularly related. This arrangement is provided so that the cables may be outwardly of the belt 13 at the ends of the conveyor so that the resilient connections between these cables and the belt will not interfere with the rotation of the belt around the drums or pulleys 14 and 15.

Endless cables 42 and 43 act to support the conveyor belt 13 and extend between similar sheaves 35 and 36 at opposite ends of the conveyor. Resilient springs 44 and 45 connect the cables 42 and 43 to opposite edges of the endless belt 13 to support this belt intermediate the ends thereof. These springs 44 and 45 are similar but are reversed in position and are preferably formed of spring wire or similar material.

Figure 13:
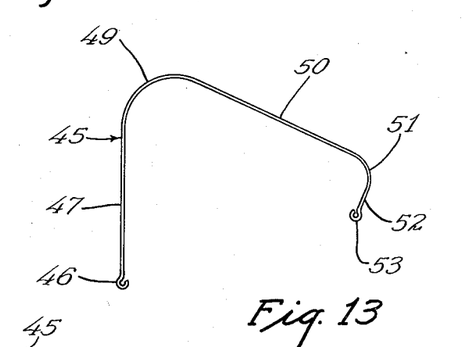
Figure 13 is an elevation view of one of the springs used in connecting the cables to the belt.

The general form of the springs 44 and 45 is illustrated in Figure 13 of the drawings. Each spring, such as 45, is provided with an end 46 designed for pivotal connection to an edge of the endless belt 13. The springs 45 are generally J-shaped in form including a shank 47 connected by a point of bend 49 to a portion 50 which is arranged at an acute angle to the portion 47. A bend 51 connects the spring portion 50 to an end portion 52 which extends at substantially right angles to the portion 50. The angularly turned end 50 is provided with an attachment 53 which forms a means of connecting each spring to a corresponding cable 42 or 43.

Figures 8, 9, 10:
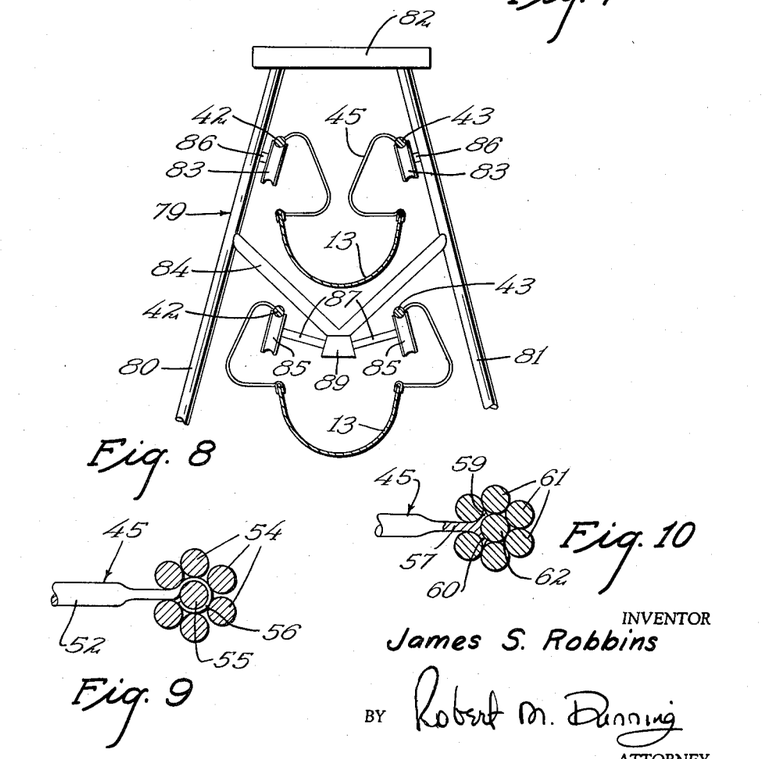
Figure 8 is a sectional view through the conveyor adjacent one of the supporting towers for the conveyor.
Figure 9 is a sectional view through one of the cables showing the manner in which the springs may be attached thereto.
Figure 10 is a view similar to Figure 9 showing a modified form of connection between the cable and the springs.

The springs 44 and 45 may be connected to the cable in various ways, certain of which are illustrated in Figures 9 through 12 of the drawings. Figure 9 of the drawings shows a cable such as 45 having a series of angularly spaced outer strands 54 which are wound spirally about a core 55. The end 52 of the spring connector is provided with a generally cylindrical or ring-shaped end 56 which encircles the core 55 and is held in place by the outer strands 54 of the cable. In other words, in forming this type of connection, the cable is spread apart so that a portion of the core is exposed, the ring-shaped portion 56 is placed to encircle the core, and the outer strands of the cable are released so as to provide a means of connecting the cable to the spring which does not materially increase the outer diameter of the cable and which does not provide a visible projection on the outer surface of the cable.

Another type of connection is illustrated in Figure 10 of the drawings. In this type of construction, the spring 45 is provided with an end 57 having projections 59 and 60 extending in opposite directions from the shank. These projections 59 and 60 are designed to extend between the outer strands 61 of the cable and the core 62 thereof so as to firmly hold the springs in place. It should be understood that the springs are arranged so as to project from the cable in the same direction so as not to place the cable under torsional stress when the conveyor is in use.

Figure 11:
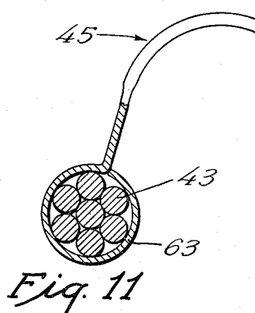
Figure 11 is a cross sectional view through the cable showing another modified form of connection between the cable and the springs.

Figure 11 illustrates another modified form of connection with the cable. In this form of construction, the spring 45 is provided with an encircling band 63 at its extremity which encircles the cable such as 43 and which is either press fit to tightly encircle the same, or is welded or otherwise secured thereto. This construction has the disadvantage over the previously described constructions that the ring 63 engages in the sheave grooves and forms a projection or bump as the ring 63 passes over each sheave.

Figure 12:
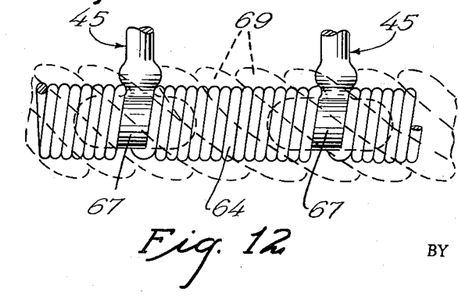
Figure 12 is a detail view of a portion of a cable core showing another modified manner in which the springs may be connected to the cable.

Figure 12 illustrates still another form of anchor between the spring such as 45 and the cable. In this form of construction, the cable is provided with a core 64 which is similar in form to a spiral spring. The end of each of the springs 45 to be connected to the cable is provided with a central anchoring member 67 which is of proper outer diameter to fit within the spring 64. The anchoring member 67 is inserted into the spring by spreading apart the spring convolutions and inserting the anchoring member 67 to extend longitudinally of the core. When the springs 45 are attached to the core 67 the outer strands 69 of the cable are wound about the core in the usual manner.

The springs such as 45 are attached to the side edges of the endless belt 13 by one of a plurality of ways, two of which are illustrated in Figures 4 through 6 of the drawings. In the arrangement illustrated in Figures 4 and 5 of the drawings, staple like elements 69 which are U-shaped in form and which are similar to those employed for leasing the ends of belts together are attached to the belt edge, these U-shaped or staple like members having inturned extremities 70 which anchor the same securely to the belt. In the particular arrangement illustrated, the staples 69 are arranged in spaced pairs to provide a spacing between the pairs. The looped end 46 of the spring 45 is placed between the pairs of staples 69, and a pivot member such as the cotter key 72 is inserted through the ends of the staples and through the looped end 46 of the spring 45 to hingedly connect these two elements.

In Figure 5 of the drawings, a modified form of anchoring means is illustrated. In this form of construction, the side edges 73 of the belt 13 are folded upon themselves and the edges are secured by stitching 74 or by other suitable means. A pivot cable 75 is enclosed in the folded edge 76 of the belt. The looped end 46 of the spring element 45 is looped about the pivot cable 75 so that each spring is connected to the pivot cable extending longitudinally of the edges of the belt.

The springs 44 and 45 are attached to the cable so as to extend from the upper surface of the cable regardless of whether the belt is inverted or not. Whether or not the belt 13 is flat during the operation of the apparatus depends upon the spacing between the supporting cables 42 and 43. If the cables 42 and 43 are spaced relatively close together, the body of the belt bellies downwardly due to the weight of the material on the belt so that the belt assumes a trough shape. If the upper edges of the belt are brought close enough together, the belt may form a substantially tubular form to practically enclose the material being carried. Thus the shape of the belt may be regulated by the position of the supporting sheaves which guide the endless cables 42 and 43 and provide a means of supporting virtually any type of loose material so that the material cannot readily fall from the conveyor even though portions of the conveyor may be relatively steep.

Figures 1 and 2 of the drawings indicate cable supporting frames 77 and 79 which act to support cable guiding sheaves for the upper and lower flights of the conveyor. These supporting frames, in the particular type of construction illustrated, are generally A-shaped in form including upwardly converging frame sides 80 and 81 connected at their upper extremity by a transverse connecting member 82. Guide sheaves 83 are rotatably supported near the top of the frame for supporting the upper flights of the endless cables 42 and 43 while a V-shaped frame 84 extends between the frame members 80 and 81 to support laterally spaced sheaves 85 designed to support the lower flight of the cables 42 and 43. The manner in which the sheaves 83 and 85 are supported may be considerably varied. In the particular arrangement illustrated, the sheaves 83 are shown as mounted upon stub shafts 86 directly connected to the framework while the sheaves 85 are mounted upon shafts 87 which project outwardly in opposite directions from a suitable supporting bracket 89 located at the center of the V-shaped support 84.

The manner in which the conveyor A is driven may be varied to some extent. However, in the particular arrangement illustrated, motors 90 and 91 are connected through suitable speed reducing units 92 and 93 to operate drive belts 94 and 95 respectively which connect the reduction unit to a corresponding pulley such as 96 rotatable with the sheaves 35 and 36 over which the endless cables 42 and 43 extend. It is possible to provide the variation in the speed of rotation of these sheaves in the event there is a curve in the conveyor or in the event one of the cables is slightly longer than the other. In the arrangement illustrated in Figures 1 to 3 of the drawings, the motors for driving the conveyor are mounted upon the top of the framework 11. However, as will be later described, it is also possible to drive the conveyor from the opposite end when preferable.

Figures 14 through 18 of the drawings, are designed to indicate diagrammatically the manner in which the conveyor belt may sway to some extent without disadvantageous results in the event the course of the conveyor is curved to some extent. An abrupt curve on a horizontal plane is, of course, not recommended nor particularly practical. However, the conveyor can be curved if the radius of curvature is sufficiently long and in such an event the belt has a tendency to follow the path diagrammatically illustrated in Figure 14 of the drawings. For the purpose of illustration, the movement is accentuated in this figure.

Figure 14:
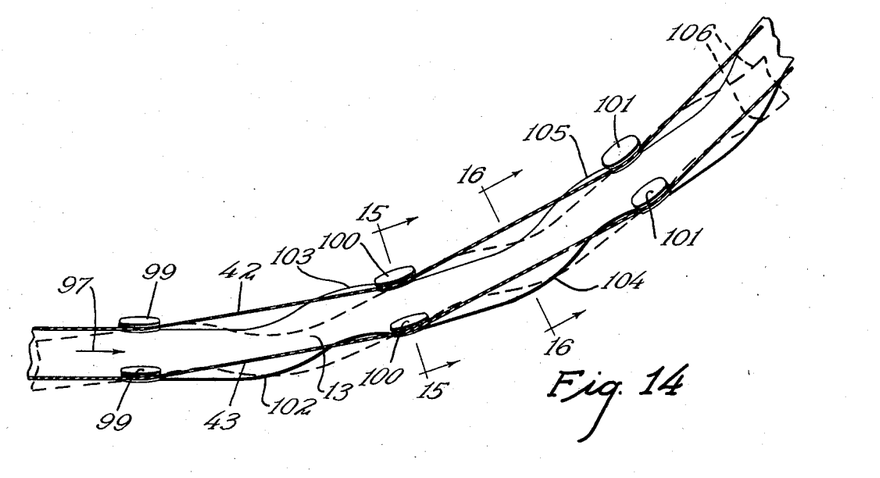
Figure 14 is a plan view showing diagrammatically the manner in which the conveyor may be curved, the figure accentuating the movement of the conveyor belt relative to the supporting cables.

If the conveyor belt 13 is travelling in the direction of the arrow 97 in Figure 14 of the drawings and it is desired to curve the path of the conveyor, cable supporting sheaves 99 are provided with their axes tilted somewhat with respect to a horizontal plane so that the supporting cables 42 and 43 may be angularly directed without placing a strain upon the cables which tends to pull from the sheave grooves. A second set of sheaves 100 is shown at some distance from the sheaves 99 and a third set of sheaves 101 are located at a later point in the curve. At the end of the curve, and where the conveyor is to bend in the opposite direction, the supporting sheaves are tilted in the opposite direction.

Figure 14 shows diagrammatically the path which the conveyor belt tends to take as it travels about the curve. As the belt moves past the first set of sheaves 99, it tends to continue in a straight path until the increased pull upon the supporting springs tends to return the belt to a position beneath the cables. The outward loop indicated by the numeral 102 indicates the straight travel of the belt past the first pulleys 99. As the supporting springs 44 and 45 tend to correct the position of the belt, they may produce an over-correction which causes the belt to sway to some extent to the opposite side of the supporting cables as is indicated by the curve designated by the numeral 103. The belt 13 then tends to return to a position directly below the cables, and I prefer to provide the next pair of guide sheaves 100 at this particular point.

As the cables 42 and 43 travel over the sheaves 100, they are again changed in direction while the belt 13 tends to move in a straight path thus again causing the side deflection indicated by the numeral 104 and the opposite direction indicated by the numeral 105. As the belt returns to a position directly below the cables, the third set of guide sheaves 101 may be provided to again change the direction of the supporting cables. While Figure 14 is exaggerated in scale, it indicates the manner in which the guide sheaves are preferably located to guide the conveyor in a horizontal curve.

Figures 15, 16, 17, 18:
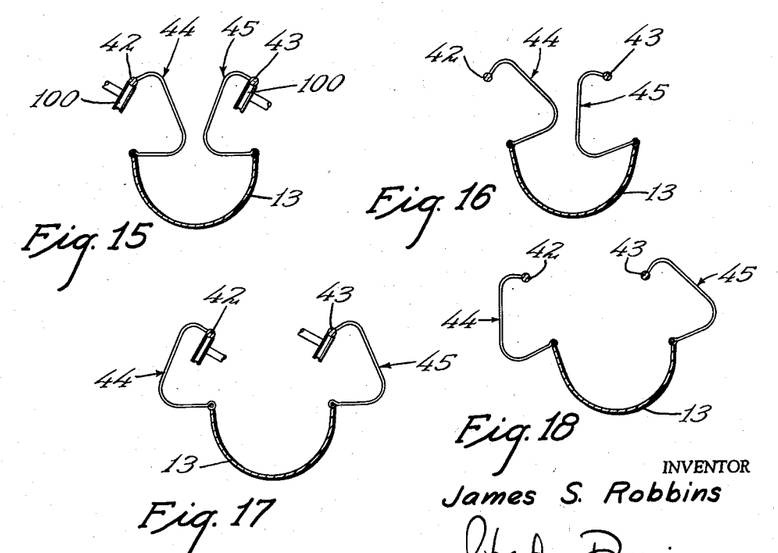
Fig. 15 is a cross sectional view through the conveyor belt, the position of the section being indicated by the line 15—15 of Figure 14.
Figure 16 is a view similar to Figure 15, the position of the section being indicated by the line 16—16 of Figure 14.
Figure 17 is a cross sectional view corresponding to Figure 15 but showing the return portion of the belt.
Figure 18 is a view corresponding to Figure 16 and showing the manner in which the belt may sway laterally relative to the cables as the conveyor is guided about a corner.

Considering that the return flight of the conveyor is directly below the upper flight illustrated and is travelling about the same curve, the belt will follow a somewhat similar path but in a reverse direction. The path of the lower flight of the conveyor is diagrammatically illustrated in dotted outline in Figure 14 of the drawings, this dotted outline path being indicated by the numeral 106. As the lower flight of the conveyor passes a pair of sheaves, the cables 42 and 43 tend to change direction while the loaded belt tends to continue to travel in a straight path. When the conveyor moves laterally to a certain extent, the supporting springs 44 and 45 tend to draw the belt back to a position beneath the cables, and in doing so oftentimes creates an over-travelling effect in the manner previously described. Figure 17 illustrates the lower conveyor when the conveyor belt is directly beneath the cables, the section being taken at a point similar to section 15—15. Figure 18 of the drawings shows the conveyor belt at a point intermediate the supporting sheaves and shows the belt laterally offset from a point directly beneath the supporting cable.

Figure 19:
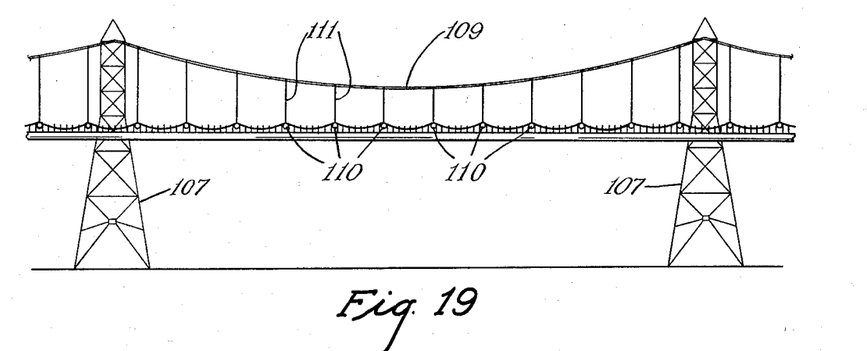
Figure 19 is a side elevational view showing a conveyor support for a cross country conveyor.
Figure 20:
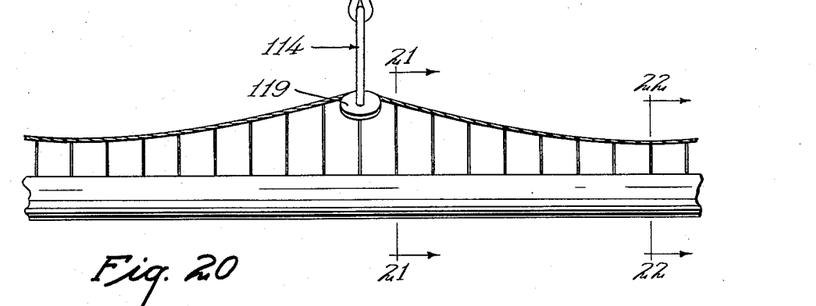
Figure 20 is an enlarged detail of a portion of the construction shown in Figure 19.

Figure 19 of the drawings shows another typical manner in which the conveyor may be supported while travelling cross-country. In Figure 19 a pair of supporting towers 107 are illustrated, these towers being two in a series of similar spaced towers. A cable 109 is suspended between the towers 107, the center portion of the cable 109 sagging beneath the points of attachment with the towers 107 in a manner somewhat similar to the cables supporting a suspension bridge. With reference to Figures 19 and 20 of the drawings, it will be noted that pairs of cable supporting sheaves 110 are supported in longitudinally spaced alignment by suitable hangers 111 connected at their upper extremities to the supporting cables 109. The hangers 111 are provided at their lower ends with sheave supports which vary depending upon whether the sheaves are supporting the forward flight of the conveyor or the return flight thereof. Sheave supports such as 112 are connected to the lower ends of the supporting hangers 111 suspended from one of the cables 109. The hangers 112 are shown as being of an inverted V-shape having diverging arms 13 and 14 terminating in inwardly converging pivots 115 and 116 which support sheaves 117 and 119. These sheaves 117 and 119 are designed to support the cables 42 and 43 which are connected by the springs 44 and 45 to the opposite edges of the conveyor belt 13.

On the opposite flight of the conveyor belt, the hangers 111 are provided at their lower ends with sheave supports 120 which may be of T-shaped form including a cross member 122 having opposed upwardly inclined sheave supports or pivots 123 at opposite ends thereof. The sheaves are indicated by the numerals 124 and 125 and are designed to support the cables 42 and 43 which are connected by the springs 44 and 45 to opposite sides of the conveyor belt 13.

Figure 23:
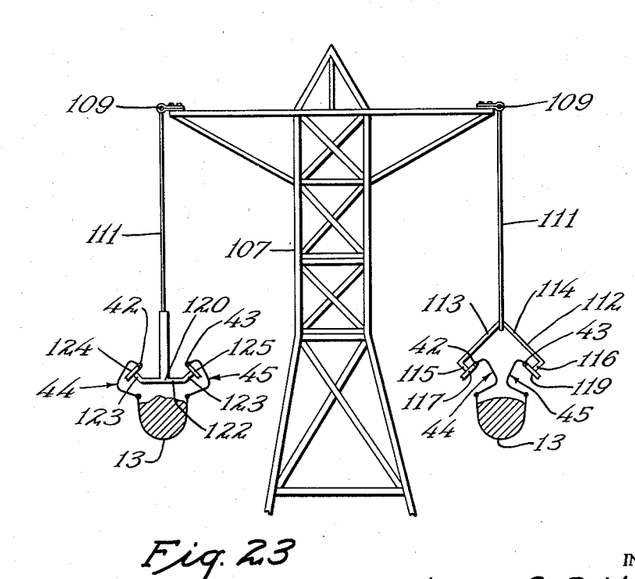
Figure 23 is a cross sectional view through the entire conveyor system illustrated in Figure 19.

As is indicated in Figure 23 of the drawings, the supporting cables 109 may be supported on opposite sides of the towers 107 so that the return flight of the conveyor may be on one side of the tower and the forward flight of the conveyor may be on the opposite side thereof. Thus at the end of the conveyor, after the belt has been inverted, the two flights of the conveyor may be guided along diverging paths until they are in side-by-side relation in the manner illustrated.

Figure 21:
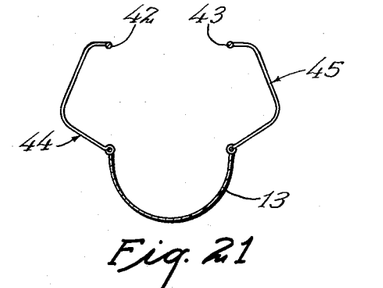
Figure 21 is a cross sectional view showing diagrammatically the manner in which the supporting springs may flex when the distance between the edges of the conveyor belt and the supporting cables increases.
Figure 22:
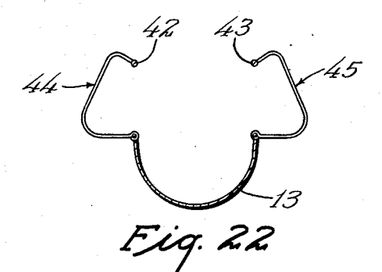
Figure 22 is a sectional view on the line 22—22 of Figure 20 showing the manner in which the springs may flex together during other portions of the travel of the conveyor.

Figures 21 and 22 illustrate diagrammatically the manner in which the springs may operate so that the conveyor can travel along a substantially level path. Figure 21 indicates the fact that in the section, diagrammatically illustrated at 21—21 in Figure 20, the springs have spread apart at their ends a substantial distance due to the tendency of the load to travel along a horizontal path. At section 22—22, the springs compress together toward their normal condition. In other words, as the belt conveyor travels between the sheaves, the cables naturally sag to some extent between the supporting sheaves. The springs which connect the cables to the sides of the conveyor belt are so formed and shaped that they may expand to some extent as the cable elevates and may compress together as the cable sags. While the figures may well be exaggerated, they do operate substantially in the particular manner described so that the material on the conveyor belt may travel in a straight path. Obviously the degree of sag between the cables depends upon the tightness of the cables and also upon the distance between the supporting sheaves.

Figure 24:
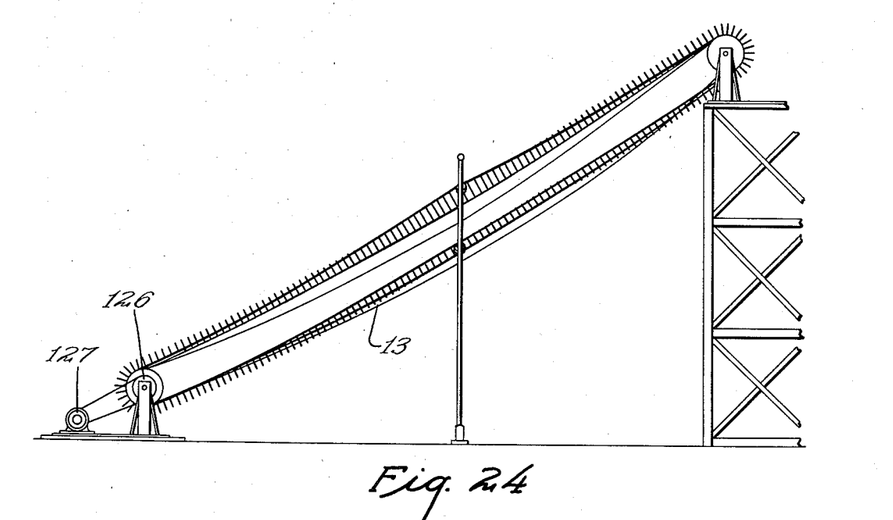
Figure 24 is a view somewhat similar to Figure 1 but showing the manner in which the conveyor may be driven from the inlet end thereof.

Figure 24 of the drawings is virtually identical with the construction described in Figure 1 of the drawings with the exception of the fact that the conveyor belt 13 illustrated in Figure 4 of the drawings is driven from a drive pulley such as 126 which is at what would normally be termed the intake end of the conveyor. In other words, considering that the upper flight of the conveyor belt 13 shown in Figure 24 is carrying a load, and the lower flight is returning empty, the motor 127 which is connected to the drive pulley or drive member 126 of the conveyor is at this inlet end. In other words, the load carrying flight of the conveyor is being pushed toward the outlet end of the conveyor rather than pulled toward it. This arrangement is believed unique with a conveyor of this construction. As the conveyor is otherwise similar to that shown in Figure 1, no further explanation is believed necessary.

In the foregoing description, the conveyor has been described as being reversed by passing about a drum such as the drum 15 shown in Figure 7 of the drawings. In certain installations, it is desirable to avoid the friction necessary to reverse the direction of the belt 13 by contact with the drum 15. It is actually possible to reverse the direction of the conveyor without actually contacting the conveyor belt 13. This is accomplished in the manner illustrated diagrammatically in Figure 25 of the drawings, this figure comprising a section taken longitudinally of the conveyor and between a pair of supporting sheaves. Two spaced sheaves 129 are mounted upon a drive shaft such as 130, the member 130 comprising either a single shaft or a pair of separately driven shafts. The latter is usually preferable. The sheaves 129 act to support the cables 42 and 43, the sheave 129 illustrated being used to support the cable 42. The belt 113 is supported by the springs 44 and 45 between the cables 42 and 43 as has been previously described.

Figure 25:
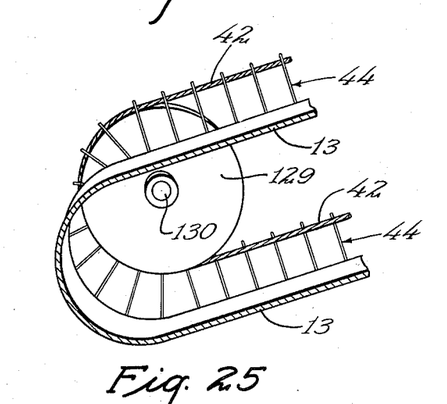
Figure 25 is a sectional view through the end of the conveyor support shown in Figure 24, showing the manner in which the conveyor may reverse directions without contacting a supporting roller or drum.

As the cables 42 and 43 pass about the sheaves 129 at the end of the conveyor, the springs 45 and 44 carry the belt 13 in substantially an arcuate path between the sheaves. Normally the arcuate path followed by the belt 13 is not coaxial with the axes of the sheaves 129. This is due to the fact that as the conveyor belt moves toward the end of the conveyor, it sags substantially below the supporting cables and the natural tendency for the belt to continue in a straight line causes the belt to follow an arcuate path somewhat beyond the arcuation of the supporting sheave. In order to prevent any danger of injury to the belt, it desirable that the sheaves 129 be of substantial diameter so that the belt will not buckle or kink as it reverses direction.

In the present invention a conveyor has been described which is capable of many uses. Actual tests indicate that material can be moved at a considerably higher speed than with conveyors of the usual construction due to the fact that the belt does not need to ride over rollers or other similar supporting means which add very greatly to the frictional resistance to operation. The springs permit a material degree of flexibility between the conveyor and its supporting cables and permit the belt to travel along a relatively smooth path. By moving the supporting cables close together, the width of the conveyor can be reduced and the belt will actually enclose a substantial portion of the belt content. As a result, loose material may be carried over considerable periods and up steep inclines without danger of the material falling from the sides of the conveyor belt. In view of the material decrease in the frictional resistance to the movement of the conveyor, the conveyor may be moved over extremely long distances without difficulty. Furthermore, the cost of operating the conveyor is extremely small as compared to the cost of operation of the usual belt conveyor. Due to the ease with which the conveyor may be supported, the conveyor may be carried along suspended cables which only require towers at considerably spaced points. This permits the conveyor to be readily used over irregular terrain and requires no level path of operation.

Figure 26:
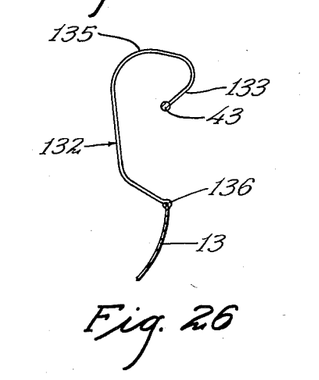
Figure 26 is an elevation view of a modified form of resilient connector for connecting the cables to the belt.

While the connectors 44 and 45 have been described as generally U-shaped, or C-shaped in form, this shape may be varied to suit different conditions. In Figure 26 I show a slightly different form of construction in which the spring 132 has one end extending upwardly at a substantial angle from vertical, as indicated at 133, then curving to extend over the cable as at 135 and to extending downwardly on the opposite side thereof, terminating approximately below the cable at its connection 136 with the belt 13. When the weight of the belt and material thereon flexes the connector, the portion of the connector between the upwardly inclined portion and the cable overlying portion tends to decrease in radius, providing a tendency for the cable to twist slightly in a clockwise direction as viewed in Figure 26. This differs from the action of a connector such as 45, in that the flexing of this spring due to weight tends to twist the cable 43 about its axis in a counter-clockwise direction.

In accordance with the patent statutes, I have described the principles of construction and operation of my conveyor, and while I have endeavored the best embodiment thereof, I desire to have it understood that this is only illustrative of a means of carrying out my invention, and that obvious changes may be made within the scope of the following claim without departing from the spirit of my invention.

I claim:

A conveyor including a pair of endless flexible cables, sheaves supporting said cables at the ends of the conveyor, intermediate sheaves supporting the intermediate portion of said cables, a flexible belt and spaced resilient connecting means connecting each cable to a corresponding belt edge, said connecting means holding said belt suspended beneath the level of said cables, said resilient means being of sufficient length, and the spacing between said cables and belt being sufficient to permit lateral flexing of said resilient means relative to both said cables and said belt and including pulleys between said sheaves supporting said cables at the ends of the conveyor about which said belt may extend.

References Cited in the file of this patent
UNITED STATES PATENTS

| | | |
|---|---|---|
| 781,138 | Etcheverry | Jan. 31, 1905 |
| 1,530,707 | Warner | Mar. 24, 1925 |
| 1,559,772 | Peale | Nov. 3, 1925 |
| 1,945,300 | West et al. | Jan. 30, 1934 |